United States Patent [19]
Ally

[11] Patent Number: 5,686,041
[45] Date of Patent: Nov. 11, 1997

[54] METHOD OF PRODUCING AN HYDRAULIC HOSE HAVING ENDS OF DIFFERENT DIAMETER

[75] Inventor: Ramzan Ally, Bucyrus, Ohio

[73] Assignee: Dayco Products, Inc., Dayton, Ohio

[21] Appl. No.: 584,849

[22] Filed: Jan. 11, 1996

[51] Int. Cl.$^6$ .................... B29B 11/10; B29D 23/00
[52] U.S. Cl. .................. 264/296; 264/209.4; 264/230; 264/342 R; 264/DIG. 71
[58] Field of Search .................... 156/86, 247; 264/209, 264/209.3, 209.4, 209.6, 230, 296, 342 R, DIG. 71, 294; 425/393; 138/177, 178, DIG. 11

[56] References Cited

U.S. PATENT DOCUMENTS

| | | | |
|---|---|---|---|
| 165,324 | 7/1875 | Greacen . | |
| 2,783,173 | 2/1957 | Walker et al. | 156/247 |
| 3,255,284 | 6/1966 | Meislohn | 264/342 R |
| 3,598,157 | 8/1971 | Farr et al. | 138/177 |
| 3,751,719 | 8/1973 | Borden . | |
| 3,824,141 | 7/1974 | Miller et al. | 156/156 |
| 3,999,912 | 12/1976 | Hall | 425/393 |
| 4,171,118 | 10/1979 | Badberg et al. . | |
| 4,800,109 | 1/1989 | Washizu | 428/34.9 |
| 5,009,730 | 4/1991 | Tozier | 264/230 |
| 5,132,073 | 7/1992 | Nielsen | 425/393 |
| 5,169,176 | 12/1992 | Brossard | 156/86 |
| 5,340,167 | 8/1994 | Morse | 156/86 |
| 5,392,831 | 2/1995 | Thomas et al. | 156/138 |

Primary Examiner—Richard Crispino
Attorney, Agent, or Firm—Joseph V. Tassone

[57] ABSTRACT

An apparatus and method for producing an hydraulic hose having ends of different internal diameters. An uncured hose is produced by conventional extrusion. The uncured hose is placed upon a mandrel having a reduced diameter end. That end of the uncured hose proximate the reduced diameter of the mandrel is covered by a heat responsive shrink tube. The shrink tube is heated to mold the end of the hose about the mandrel. Thereafter, the hose is vulcanized.

12 Claims, 3 Drawing Sheets

METHOD OF PRODUCING AN HYDRAULIC HOSE HAVING ENDS OF DIFFERENT DIAMETER

BACKGROUND OF THE INVENTION

This invention relates to the production of elastomeric pressurized fluid conveying system hoses and more particularly to a method of producing a pressurized fluid conveying system hose having ends of different diameter. Such hoses are commonly used in automotive vehicles for carrying hydraulic fluid between a pump, a reservoir and an hydraulic device such as a power steering unit.. These hoses, commonly called hydraulic hoses, are customarily of uniform internal diameter and are clamped or coupled at each end to a nipple having an external diameter substantially equal to the internal diameter of the hose. This creates a design constraint for the equipment being serviced by the hose. Oftentimes it is desirable to present the hose ends to nipples of different external diameter. This requires an hydraulic hose having ends of different internal diameter. Heretofore there has been no economical way of producing a hose having a reduced diameter on at least one end.

It is known in the prior art to build a hose upon a mandrel in such a way as to produce an end of slightly reduced diameter, as shown, for example, in Greacen U.S. Pat. No. 165,324. However, the Greacen method proceeds by a complicated series of steps involving placement and positioning on the mandrel of a rubber core, a helically coiled, tempered and untempered steel wire and a suitable covering material. It is also known to place a hose upon a mandrel for curing and to wrap the hose with shrink film to compress it against the mandrel, as taught by Borden U.S. Pat. No. 3,752,719. Other prior art, such as Badberg et. al. U.S. Pat. No. 4,171,118, reshapes a cylindrical hose into a hose of complex configuration by vulcanization upon a specially shaped mandrel having at least one end enlarged.

SUMMARY OF THE INVENTION

This invention provides a method of producing an hydraulic hose adapted to carry hydraulic fluid between nipples of different diameter. The method involves producing of an uncured hose of uniform diameter and placing the uncured hose over a mandrel of non-uniform crossection. The mandrel has a diameter at one end which is substantially the same as the internal diameter of the uncured hose and a diameter at the other end which is substantially less. The uncured hose is placed on the mandrel in such a manner as to span the length of the mandrel between the crossections of different diameter. After the hose has been seated on the mandrel, the end of the hose is fitted with a heat responsive shrink tube. The shrink tube is heated to mold the uncured hose about the mandrel. Thereafter, the hose is vulcanized, preferably with the tube still in place. Following vulcanization, the shrink tube may be stripped from the hose. Preferably the mandrel is coated with a suitable lubricant for reception of the uncured hose. Also, the end of the uncured hose preferably is covered by a lubricant so as to facilitate removal of the shrink tube following vulcanization.

DESCRIPTION OF THE PREFERRED EMBODIMENT

Figure 1:
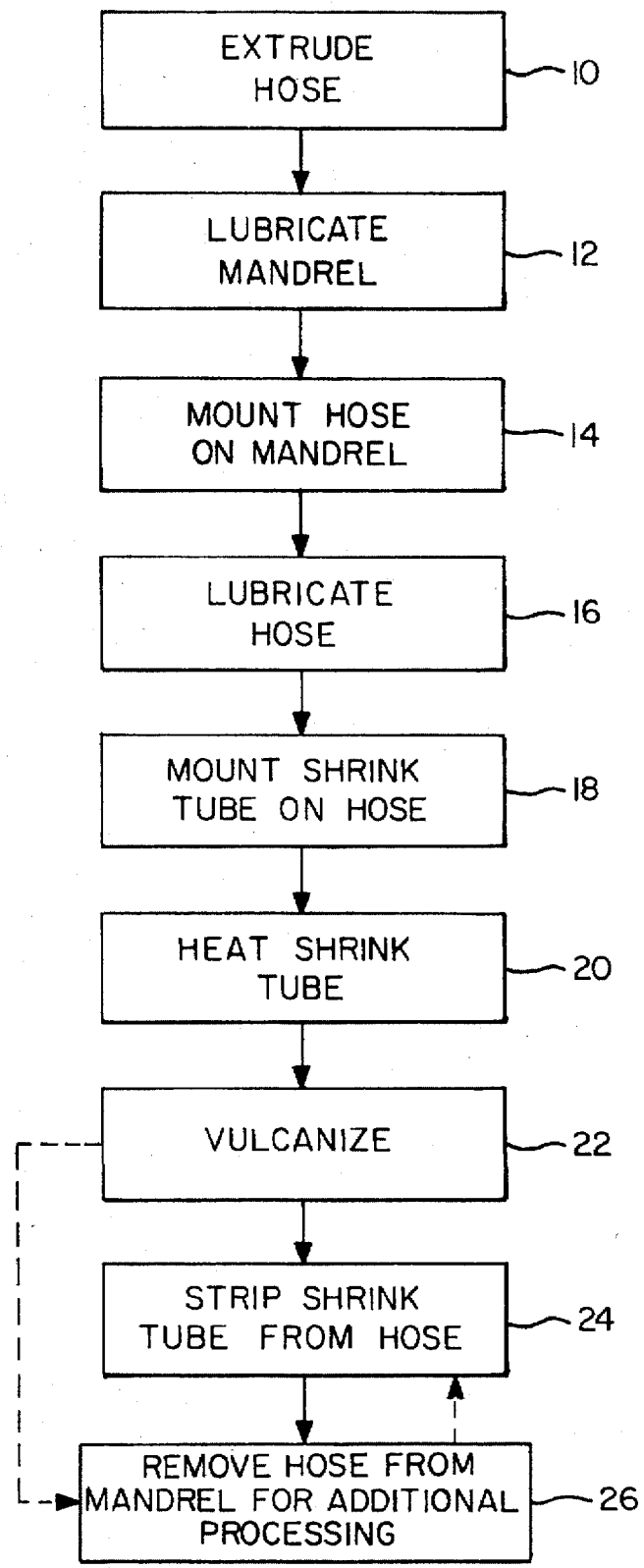
FIG. 1 is a flow chart illustrating the method of this invention.

Production of an hydraulic hose in accordance with this invention proceeds as illustrated by the flow chart of FIG. 1 and commences at block 10 with formation of an uncured elastomeric hose of substantially uniform internal diameter. The hose may be of rubber or synthetic rubber and may be produced by a conventional extrusion process. Suitable methods for extruding such an uncured hose are taught in Miller et al, U.S. Pat. No. 3,824,141 and in Derderian et al U.S. Pat. No. 3,972,757. A typically resulting uncured hose may have an internal diameter of about 0.75 inches and an external diameter of about 1.09 inches. Such an uncured hydraulic hose may appear as indicated by reference numeral 30 of FIGS. 2–6.

Figure 2:
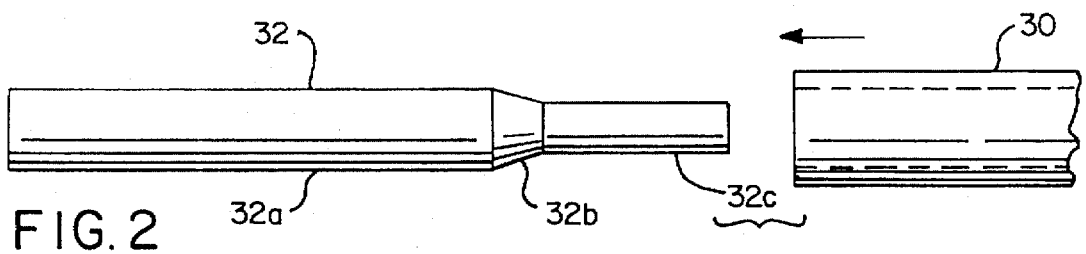
FIG. 2 is a schematic illustration of an uncured hose being placed upon a mandrel.

After the uncured hose 30 has been produced, it is placed upon a mandrel 32, as illustrated in FIG. 2. Mandrel 32 may have an enlarged end 32a, a transition section 32b, and a reduced end 32c. The end 32a should have a diameter substantially equal to the internal diameter of the uncured hose 30, while end 32c may have a substantially smaller diameter. In a typical application where the uncured hose has an internal diameter of 0.75 inches, mandrel 32 may have a diameter of 0.75 inches at the end 32a and a diameter of about 0.61 inches at end 32c.

As illustrated in FIG. 2, uncured hose 30 is placed over the smaller end 32c of mandrel 32 and then worked up over transition section 32b onto the enlarged end 32a. This placement may be facilitated by applying a suitable lubricant to end 32a of mandrel 32. A wide variety of suitable lubricants are commercially available. One lubricant which has been tested and found to be satisfactory is sold commercially under the trademark "UCON." This lubricating step is indicated in FIG. 1 at block 12.

Figure 3:
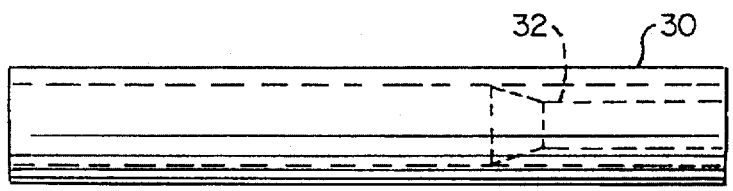
FIG. 3 is an illustration of an uncured hose in position upon a mandrel.

FIG. 3 indicates the position of the mandrel 32 following full insertion into uncured hose 30. It will be noted that uncured hose spans the length of the mandrel between ends 32a, 32c. Placement of uncured hose 30 upon mandrel 32 is indicated by block 14 of FIG. 1.

After the uncured hose has been mounted upon the mandrel, the method proceeds to the step of block 16 wherein a lubricant is placed upon the end of uncured hose 30 proximate reduced end 32c of mandrel 32. This lubricant facilitates removal of a shrink tube as hereinafter described. Again, UCON lubricating liquid or a similar product may be used.

Figure 4:
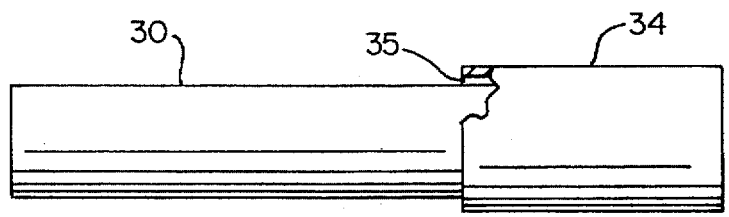
FIG. 4 is a schematic illustration of a shrink tube in place about an end of an uncured hydraulic hose.

As indicated by block 18 of FIG. 1, the next step in the process involves the mounting of a shrink tube on uncured hose 30. Such a shrink tube is indicated by reference numeral 34 of FIG. 4. The internal diameter of shrink tube 34 should be slightly greater than the external diameter of uncured hose 30, as illustrated in FIG. 4 by the reference numeral 35. In a typical case where the exterior diameter of uncured hose 30 is about 1.09 inches, shrink tube 34 may have an internal diameter of about 1.31 inches. A suitable shrink tube for the purpose is sold commercially by Raychem under the trademark "RNF-3000." This tubing is made from a proprietary radiation cross-linked polyolefin material and has a shrink ratio of 3:1 when heated to 120° C. A satisfactory shrink tube of the above internal diameter has a wall thickness of about 1.15 millimeters.

Figure 5:
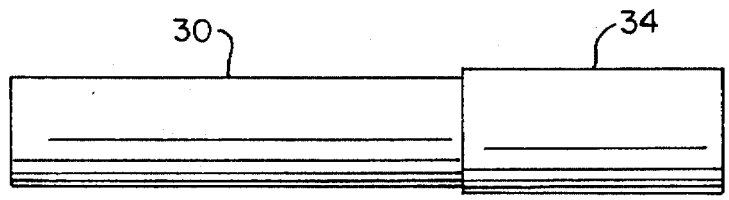
FIG. 5 illustrates an uncured hose having a shrink tube reduced to snugly fit the O.D. of the uncured hose.
Figure 6:
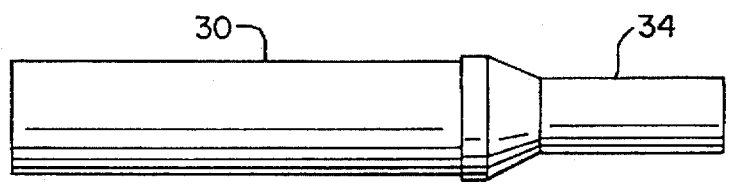
FIG. 6 illustrates a cured hose following molding by vulcanization with the shrink tube.

Heat shrinking of the tube 34 is indicated by block 20 of FIG. 1. Heat application for this purpose may be accomplished by blowing hot air over shrink tube 34. Heating and shrinking proceeds until shrink tube 34 is snugly fitted against uncured hose 30, as illustrated in FIG. 5. After a snug fit has been achieved, uncured hose 30 is vulcanized with shrink tube 34 in place, as indicated by block 22 of FIG. 1. This step cures the hose while concomitantly causing further shrinking of shrink tube 34. Vulcanizing continues until hose 30 has been fully molded about reduced end 32C of mandrel 32 and cured. This is illustrated in FIG. 6.

Figure 7:
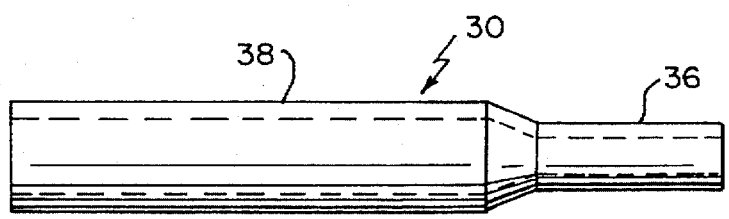
FIG. 7 illustrates an hydraulic hose produced in accordance with this invention.

Vulcanizing (or curing) is carried out in the conventional manner in a vulcanizing oven at a temperature of about 320° F. for about 20 minutes. Thereafter shrink tube 34 may be stripped from hose 30, and hose 30 may be removed from mandrel 32, as indicated by blocks 24 and 26 of FIG. 1. FIG. 7 illustrates the finished product.

It will be appreciated that further processing steps may be performed upon the cured hose 30, either prior to or following removal from mandrel 32. Also, hose 30 may be removed from mandrel 32 with shrink tube 34 in place. These alternatives are indicated by dotted lines on FIG. 1.

The above method has been performed repeatedly with good results in reducing a rubber hose from an internal diameter of 0.75 inches to an internal diameter of 0.61 inches. Good results have also been obtained in achieving other diameter reductions. For a reduction from 0.75 inches to 0.49 inches (internal diameters) two shrink tubes are preferred. The first step involves the application of heat to shrink tube 34 until the shrink tube 34 is snugly fitted against the uncured hose 30 as described above. Then a second shrink tube (not illustrated) is placed over the first shrink tube and heated until a snug fit has been achieved. A vulcanizing step then produces the final desired shrink.

Figure 8:
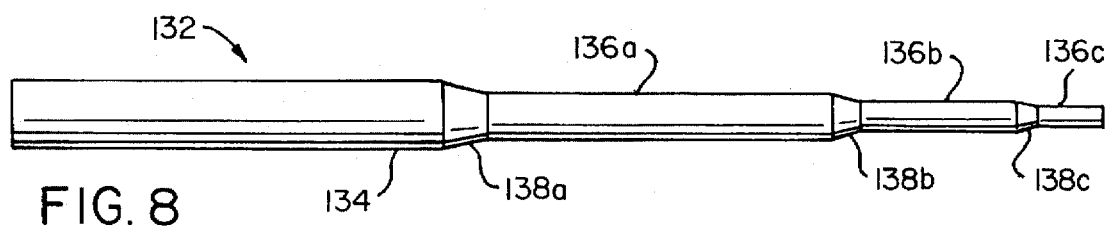
FIG. 8 illustrates a mandrel for use in this invention having multiple size reductions.
Figure 9:
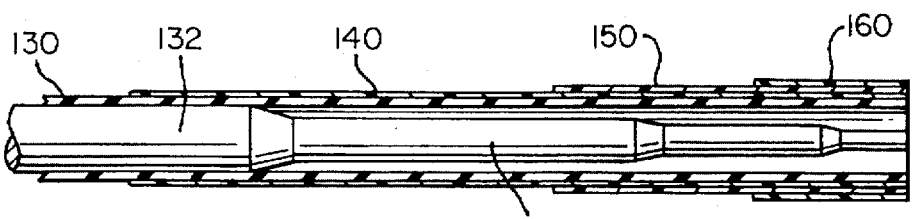
FIG. 9 illustrates an uncured hose mounted upon the mandrel of FIG. 8.
Figure 10:
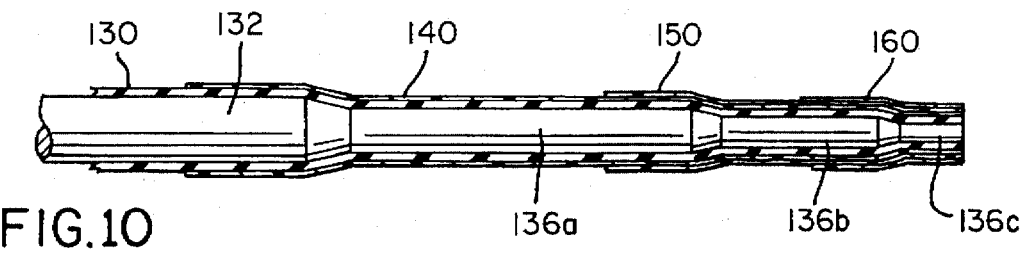
FIG. 10 illustrates a cured hose following simultaneous molding by vulcanization on the mandrel of FIG. 8.

Even greater hose end reductions are possible through use of multiple tubes. Such a multiple reduction may be carried out with the aid of a mandrel 132, as illustrated in FIG. 8. Mandrel 132 may have a full diameter section 134, joined to a plurality of reduced diameter sections 136a, 136b and 136c by a plurality of transition sections 138a, 138b and 138c. In use an uncured hose 130 is placed over mandrel 132 and fitted with a first shrink tube 140 which spans the distance from the smallest end 136c beyond the first reduced diameter section 138a, as illustrated in FIG. 9. Then hose 130 and shrink tube 140 are heated until shrink tube 140 is snugly fitted against the uncured hose 130. At this point a second shrink tube 150 is applied spanning the length from the smallest end 136c beyond the second reduced diameter section 138b, and a second heating step is performed shrinking the second tube snugly against the first tube. Following this step a third shrink tube 160 is applied, spanning the length from the end 136c beyond the final transition 138c. A third heating step shrinks the third tube snugly against the second tube. Thereafter, the vulcanizing step reduces the uncured hose conforming same to the mandrel. This arrangement has successfully reduced a hose end from an initial inside diameter of 0.75 inch to a final inside diameter of 0.25 inch. The final configuration may be as generally illustrated in FIG. 10.

Still other applications of the method of this invention are possible. For example, the mandrel may be provided with a section of elliptical, or slightly flattened crossection. The circumference of this portion of the mandrel may be reduced in the order of about 10 percent from the inside circumference of the uncured hose, thereby facilitating removal of the hose from the mandrel while still warm from vulcanization.

While the method herein described constitutes a preferred embodiment of this invention, it is to be understood that the invention is not limited to this precise method, and that changes may be made without departing from the scope of the invention, which is defined in the appended claims.

What is claimed is:

1. Method of producing an hydraulic hose comprising the steps of:
   (a) extruding an elastomeric hose to produce an uncured hydraulic hose having an annular first end, an annular second end and a substantially uniform inside diameter therebetween;
   (b) pushing said uncured hydraulic hose over a mandrel, said mandrel having a substantially cylindrical first end of a first predetermined diameter substantially equal to said inside diameter, a substantially cylindrical second end of a second predetermined diameter substantially less than said first predetermined diameter and a transition section therebetween, said pushing being continued until said uncured hydraulic hose spans the length of said mandrel with said first and second ends of said uncured hydraulic hose being positioned at said second and first ends respectively of said mandrel;
   (c) placing a heat responsive shrink tube around said first end of said uncured hydraulic hose, said shrink tube covering said first end of said uncured hydraulic hose and extending therefrom to a portion of said hose supported by said transition section of said mandrel;
   (d) applying heat to said shrink tube in sufficient amount to cause said shrink tube to shrink into engagement with said uncured hydraulic hose; and
   (e) applying heat to said shrink tube and to said uncured hydraulic hose, said heat being sufficient to mold said first end of said uncured hydraulic hose about said second end of said mandrel and cure said uncured hydraulic hose.

2. Method according to claim 1 wherein heat is applied to said shrink tube and to said uncured hydraulic hose at a first level for a sufficient period to time to mold said first end of said uncured hydraulic hose about said second end of said mandrel, said heat thereafter being raised to a higher level for curing said uncured hydraulic hose.

3. Method according to claim 2 where said tube is maintained in contact with said uncured hydraulic hose during said curing.

4. Method according to claim 3, further comprising the steps of:
   (a) lubricating said mandrel prior to said pushing step; and
   (b) lubricating said uncured hydraulic hose exteriorly about said end prior to said placing step.

5. Method according to claim 4, further comprising the step of removing said tube from said hydraulic hose following said applying step.

6. Method according to claim 5 wherein said first level is approximately 250° F., and said higher level is approximately 331° F. and is maintained for approximately 21 minutes.

7. Method according to claim 5 wherein said first predetermined diameter is approximately 0.75 inches and said second predetermined diameter is approximately 0.61 inches.

8. Method of producing an hydraulic hose comprising the steps of:

(a) Extruding an elastomeric material to produce an uncured hydraulic hose having a substantially uniform inside diameter;

(b) Pulling said uncured hydraulic hose over a mandrel, said mandrel having a substantially cylindrical first end of a first diameter substantially equal to said inside diameter, a substantially cylindrical second end of a second diameter substantially less than said first diameter and a transition section therebetween, said pulling being performed in such a manner as to position said second end of said mandrel at a first end of said hose and said first end of said mandrel remote therefrom;

(c) Placing around said first end of said uncured hydraulic hose, a shrink tube comprising a radiation cross-linked polyolefin material having a wall thickness of approximately 1.15 millimeters and a shrink ratio of about 3:1 in the presence of heat at a temperature of about 250° F., said shrink tube covering said first end of said uncured hydraulic hose and extending therefrom to a portion of said hose proximate said transition section of said mandrel (d) Shrinking said shrink tube against said uncured hydraulic hose by blowing hot air thereover; and (e) Thereafter molding said hydraulic hose against said mandrel by curing said uncured hydraulic hose while said shrink tube is shrunk thereagainst.

9. Method according to claim 8 wherein said uncured hydraulic hose is extruded by a process which produces an internal diameter of about 0.75 inches and an external diameter of about 1.31 inches.

10. Method according to claim 9 wherein said molding step reduces said internal diameter to about 0.61 inches.

11. Method according to claim 10 wherein said curing is performed for about 21 minutes at a temperature of about 331° F.

12. Method of producing an hydraulic hose comprising the steps of:

(a) extruding an elastomeric hose to produce an uncured hydraulic hose having a substantially uniform inside diameter:

(b) pushing said uncured hydraulic hose over a mandrel, said mandrel having a substantially cylindrical first section of a first predetermined diameter substantially equal to said inside diameter and a plurality of other sections of progressively decreasing diameters with transition regions therebetween, said pushing being continued until said uncured hydraulic hose spans the length of said mandrel across said first section and said other sections;

(c) placing a heat responsive first shrink tube about said uncured hydraulic hose in a region thereof which spans said transition regions and said other sections of said mandrel;

(d) applying heat to said first shrink tube in sufficient amount to cause said first shrink tube to conform to the outside circumference of said uncured hydraulic hose;

(e) repeating said placing and applying steps for progressively shorter shrink tubes spanning sections of said mandrel having progressively smaller diameters wherein said progressively shorter tubes are placed and applied individually such that each progressively shorter tube conforms snugly to a previously applied tube; and (f) applying heat to said shrink tubes in sufficient amount to cause said shrink tubes to mold said uncured hydraulic hose against said plurality of other sections and said transition regions, said heat being sufficient to cure said uncured hydraulic hose.

\* \* \* \* \*